June 11, 1940.   J. J. GALLAGHER   2,204,304
JOINT EQUALIZER SPRING
Filed Feb. 25, 1939   2 Sheets-Sheet 1
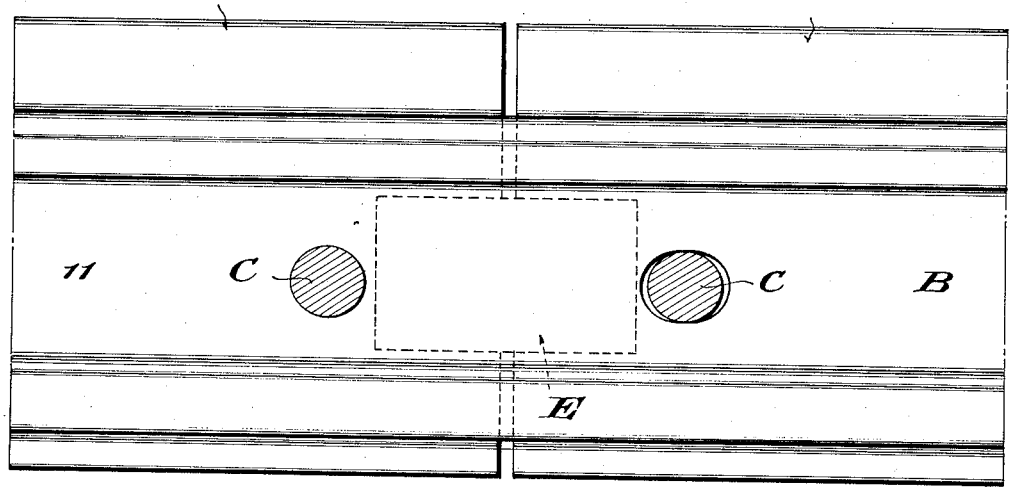
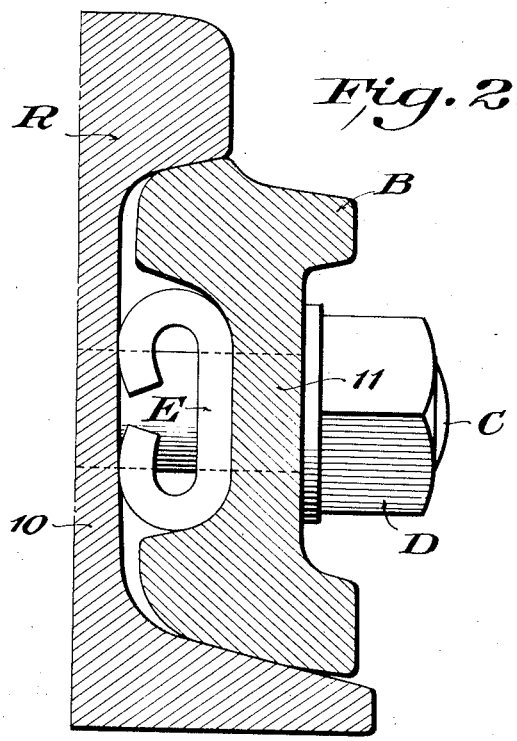
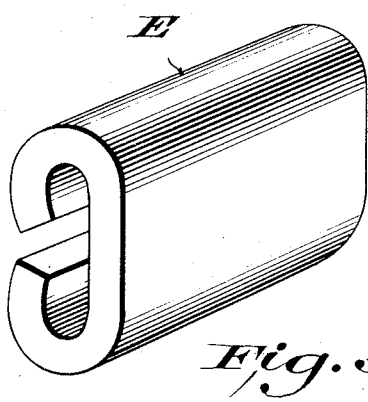
Inventor
J. J. Gallagher,
By D. P. Wolhaupter
Attorney June 11, 1940.  J. J. GALLAGHER  2,204,304
JOINT EQUALIZER SPRING
Filed Feb. 25, 1939  2 Sheets-Sheet 2

Inventor
J. J. Gallagher,
By D. P. Wolhaupter
Attorney

Patented June 11, 1940

2,204,304

UNITED STATES PATENT OFFICE 2,204,304

JOINT EQUALIZER SPRING

John J. Gallagher, Denver, Colo., assignor to Poor & Company, New York, N. Y., a corporation of Delaware Application February 25, 1939, Serial No. 258,518

1 Claim. (Cl. 238—259)

This invention relates to rail joints, and has generally in view to provide a rail joint accessory designed to avoid certain disadvantages heretofore encountered in rail joints of certain types and, at the same time, to accomplish certain very desirable functions contributing to the increased efficiency and better functioning of rail joints in general.

In certain types of rail joints, notably in rail joints for heavier rails designed for modern, high speed traffic and particularly in rail joints employing heavy splice bars of the toeless type, it has been found that when the joint bolts are tightened sufficiently to prevent loose nuts, as must necessarily be done to insure tight joints, "frozen" joints sometimes result, regardless of lubrication of the joints.

As is well known, a so-called "frozen" joint is one in which the rails and the splice bars are interlocked against relative movement. Also, as is well known, such joints have many serious disadvantages. "Freezing" may occur due to various causes, but in joints employing heavy splice bars of the toeless type "freezing" no doubt is prone to occur due to the comparatively narrow base fishing surfaces of the bars, combined, in many instances, with excessive tensioning of the joint bolts. Just the right amount of tensioning of the joint bolts to insure that the nuts will not become loose and, at the same time, to insure a properly tightened condition of the joint, is difficult to determine, leading to the tendency to excessively tighten the bolts. With very little excessive tightening of the bolts there results a concentrated pressure between the comparatively narrow fishing surfaces of the bars and the rails so great as to produce a "frozen" or immovable relationship between the splice bars and the rails. This, as aforesaid, is quite disadvantageous and should be avoided. Accordingly, one important object of the present invention is to provide a rail joint accessory which, despite tightening of the joint bolts to or in excess of the amount required to insure tightness of the nuts, insures, at the same time, a free-running or non-frozen relationship between the splice bars and the rails.

Other important objects of the invention are: to provide a rail joint accessory which, in large measure, eliminates cocked bars, so apt to occur with serious consequences in rail joints employing splice bars having narrow fishing surfaces; which serves to reinforce joints where they are weakest, namely, at their middle; and which functions to advantageously equalize bolt tension.

With the foregoing and other objects in view, which will become more fully apparent as the nature of the invention is better understood, the same consists in a rail joint embodying the novel combination and arrangement of features as will be hereinafter more fully described, illustrated in the accompanying drawings and defined in the appended claim.

In the accompanying drawings, wherein like characters of reference denote corresponding parts in related views:

Figure 1 is a side elevation of a rail joint including an accessory constructed and arranged in accordance with one practical embodiment of the invention.

Figure 2 is a cross section through the joint shown in Figure 1.

Figure 3 is a perspective view of the accessory shown in Figures 1 and 2.

Figure 4:
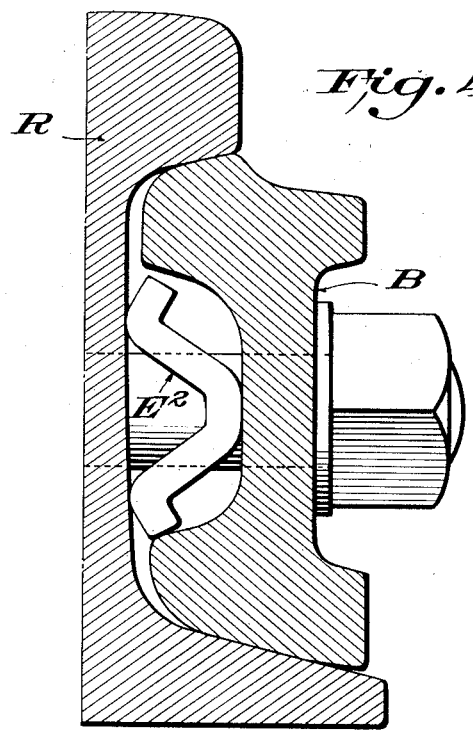
Figure 4 is a view similar to Figure 2 illustrating an alternative embodiment of the invention.

Referring to the drawings in detail, first with particular reference to the embodiment of the invention illustrated in Figures 1 to 3, R, R designate the meeting end portions of a pair of rails; B designates, generally, an associated splice bar of the heavy toeless type; C designates joint bolts extending through the webs of the rails and the splice bar, and D designates nuts threaded on the bolts C for cooperation therewith to draw the splice bar into engagement with the rails, all as is usual and well known.

In accordance with the invention, there is interposed between the webs 10 of the rails and the web 11 of the splice bar, suitable spring means, designated generally as E, to be energized by tightening of the joint bolts and drawing of the splice bar inwardly and to exert a force upon the splice bar tending to move the same outwardly relative to the rails. The spring means E is constructed to resist inward movement of the splice bar to an extent to enable the nuts D to be amply tightened to insure against loosening of the same and, at the same time, to insure against the splice bar being so tightly drawn into engagement with the rails as to have a "frozen" or immovable relationship thereto. Accordingly, the primary object of the invention, namely, to provide means to enable ample tightening of the joint bolts while insuring against a "frozen" condition of the joint, thereby is accomplished.

The spring means E may have various different forms. As illustrated in Figures 1 to 3 it may be of substantially C-shape in cross section, of a height corresponding substantially to the height of the web 11 of the splice bar, and may be of a length corresponding substantially to the distance between the two innermost joint bolts C. It is preferably of spring steel stock of suitable thickness and fits, as shown, between the web of the splice bar and the webs of the rails so as to react from the latter to yieldably resist inward movement of the splice bar relative to the rails. Its split side preferably is disposed inwardly and its continuous side preferably is disposed outwardly and preferably also is formed to snugly fit the inner side of the splice bar between the inwardly directed head and base portions of the latter. Its normal width is, of course, greater than the normal spacing of the adjacent faces of the rail and the splice bar webs. It accordingly contacts with the rail and the splice bar webs prior to fishing engagement of the splice bar with the rails and thereby acts by its stiff, though resilient, resistance to inward movement of the splice bar not only to accomplish the purpose heretofore stated, but to insure that the splice bar does not assume a cocked position relative to the rails, since it acts to insure proper initial positioning of the splice bar relative to the rails. Moreover, when used only between the two innermost joint bolts as shown, it obviously serves to equalize the tension of said bolts and, at the same time, serves to materially reinforce the joint at its weakest point, namely, at its center.

Figure 6:
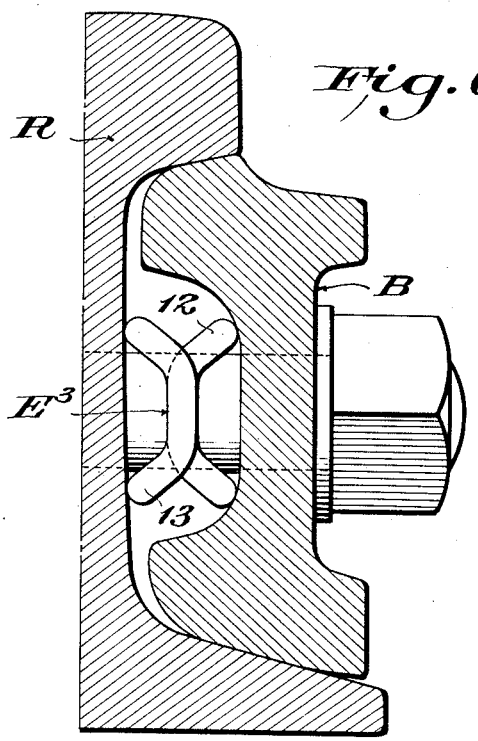
Figure 6 is a view similar to Figures 2 and 4 illustrating another alternative embodiment of the invention.

Instead of being of a length to fit between the two innermost joint bolts, the spring means E may be of any greater length desired, up to the length of the joint. Moreover, instead of being of leaf form it may be in the form of one or more short, stiff coils disposed around or between the two innermost or any other of the joint bolts. Preferably, however, it is of leaf form, either of the cross sectional shape shown in Fig. 2 or of some equivalent cross sectional shape as suggested by Figures 4 and 6. Moreover, it preferably is confined to the middle portion of the joint, as thereby it accomplishes, with a material saving in metal, substantially all that would be accomplished if it were of greater length. In any event, it serves the additional desirable purpose of resisting detrimental inward deflection of the middle of the splice bar under wheel load.

Figure 5:
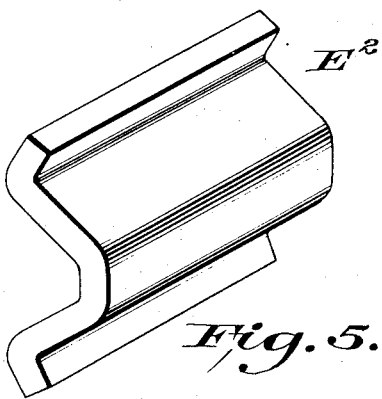
Figure 5 is a perspective view of the accessory shown in Figure 4.
Figure 7:
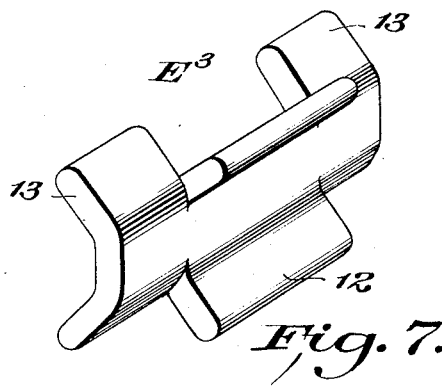
Figure 7 is a perspective view of the accessory shown in Figure 6.

According to the construction illustrated in Figures 4 and 5 the spring means, designated as $E^2$, is generally speaking, of channel shape in cross section, with its apex preferably engaging the inner side of the joint bar web, and its spaced legs engaging the rail web. And, according to the construction illustrated in Figures 6 and 7 the spring means, designated as $E^3$ may be of substantially X-shape in cross section, being formed by deflecting intermediate and end marginal leg or wing portions 12 and 13, respectively, of a flat blank of material in opposite directions, as more clearly illustrated in Figure 7 to respectively engage the rail web and the bar web. As will be understood, these alternative cross sectional shapes are representative of various other cross sectional shapes that may be used if desired.

Without further description it is thought that the features and advantages of the invention will be readily apparent to those skilled in the art, and it will of course be understood that changes in the form, proportion and minor details of construction may be resorted to, without departing from the spirit of the invention and scope of the appended claim.

I claim:

In a rail joint, the rail, the splice bar having inner head and foot projections at its inner side, and a spring plate substantially corresponding in height to the distance between said inner head and foot projections of the splice bar, the said spring plate having an upright web and upper and lower bent end portions adapted respectively to firmly engage the said inner head and foot projections of the splice bar, said bent end portions extending laterally relative to said upright web portion by amounts such that the normal over-all width of the spring plate is greater than the width of the space between the web of the splice bar and the webs of the rails when the splice bar is operatively applied to the rails.

JOHN J. GALLAGHER.